(12) United States Patent
Abe et al.

(10) Patent No.: US 7,969,309 B2
(45) Date of Patent: Jun. 28, 2011

(54) RFID LABEL ATTACHING METHOD, RFID LABEL ATTACHING DEVICE, AND RFID LABEL

(75) Inventors: Toshiaki Abe, Tokyo (JP); Hiroyuki Suzuki, Tokyo (JP)

(73) Assignee: Kabushiki Kaisha Sato (JP)

( * ) Notice: Subject to any disclaimer, the term of this patent is extended or adjusted under 35 U.S.C. 154(b) by 591 days.

(21) Appl. No.: 11/719,632

(22) PCT Filed: Jul. 20, 2006

(86) PCT No.: PCT/JP2006/314432
§ 371 (c)(1),
(2), (4) Date: Jun. 6, 2007

(87) PCT Pub. No.: WO2007/013357
PCT Pub. Date: Feb. 1, 2007

(65) Prior Publication Data
US 2008/0303666 A1 Dec. 11, 2008

(30) Foreign Application Priority Data

Jul. 29, 2005 (JP) .................................. 2005-219872
Jul. 29, 2005 (JP) .................................. 2005-219873
Jul. 29, 2005 (JP) .................................. 2005-219874
Jul. 29, 2005 (JP) .................................. 2005-219875

(51) Int. Cl.
*G08B 13/14* (2006.01)
(52) U.S. Cl. .................................. 340/572.1; 340/572.8
(58) Field of Classification Search ........................ None
See application file for complete search history.

(56) References Cited

U.S. PATENT DOCUMENTS
4,032,386 A * 6/1977 Fleet .............................. 156/475
(Continued)

FOREIGN PATENT DOCUMENTS
JP   2001-209767   8/2001
(Continued)

OTHER PUBLICATIONS

International Search Report PCT/JP2006/314432 dated Aug. 8, 2006 (Japanese Patent Office).

*Primary Examiner* — Julie Lieu
(74) *Attorney, Agent, or Firm* — Ostrolenk Faber LLP

(57) ABSTRACT

A RFID tag is partially separable from an article to which the tag is applied such that influence on the RFID tag from the article may be reduced thereby. A label is applied to an article, wherein the label is tacked on a backing paper. The label is fixed with a tag-fixed portion fixed with a RFID tag comprising an IC chip and a communication antenna. The tag-fixed portion has a predetermined size and is partitioned from a common label portion. The common label portion is partitioned into a first label portion that is articulated with the tag-fixed portion and a second label portion, from which the tag-fixed portion is separable along a partition line extending across the common label portion from a side of the tag-fixed portion. The method comprises associating the first label portion of the common label portion with a first surface of the article such that the partition line of the label follows a corner line of a corner portion of the article, and applying the label to the article such that the tag-fixed portion articulated with the first label portion is raised from the article.

17 Claims, 17 Drawing Sheets

U.S. PATENT DOCUMENTS

| | | | |
|---|---|---|---|
| 7,450,011 B2 * | 11/2008 | Duschek | 340/572.8 |
| 7,703,687 B2 * | 4/2010 | Barczyk et al. | 235/492 |
| 2002/0130778 A1 * | 9/2002 | Nicholson | 340/572.1 |
| 2006/0267572 A1 * | 11/2006 | Sellars | 324/90 |
| 2006/0290471 A1 * | 12/2006 | Van Alstyne | 340/10.1 |
| 2008/0087565 A1 * | 4/2008 | Chappuis et al. | 206/438 |

FOREIGN PATENT DOCUMENTS

| | | |
|---|---|---|
| JP | 2002-109497 | 4/2002 |
| JP | 2004295466 A | 10/2004 |
| JP | 2005-196377 | 7/2005 |
| JP | 2005196377 A | 7/2005 |

* cited by examiner

RFID LABEL ATTACHING METHOD, RFID LABEL ATTACHING DEVICE, AND RFID LABEL

CROSS REFERENCE TO RELATED APPLICATION

The present application is a 35 U.S.C. §§371 national phase conversion of PCT/JP2006/314432, filed Jul. 20, 2006, which claims priority of Japanese Application No. 2005-219872, filed Jul. 29, 2005; Japanese Application No. 2005-219873, filed Jul. 29, 2005; Japanese Application No. 2005-219874, filed Jul. 29, 2005; and Japanese Application No. 2005-219875, filed Jul. 29, 2005. The PCT International Application was published in the Japanese language.

BACKGROUND OF THE INVENTION

1. Field of the Invention

The present invention relates to a RFID label application method for applying a label to an article, a RFID label application device thereof and a RFID label, wherein the label is fixed with a RFID tag having an IC chip therein for storing various information.

2. Description of the Related Art

In a recent widely used technology as described in FIG. 15, an IC (integrated circuit) chip Ta for storing various information and a RFID (Radio Frequency Identification) tag T comprising a communication antenna Tb connected to the IC chip Ta are together fixed inside a label L which may be applied to various articles, to provide wireless communication with a reader, non-contact automatic identification by means of the RFID tag T.

FIG. 15 hereof shows a label L which is fixed with a RFID tag T. The label L comprises an outer display layer U and an inner adhesive layer B, at the back of the display layer U. The adhesive layer is fixed on the RFID tag T. The display layer U and the adhesive layer B are serially tacked on a backing paper D.

The RFID tag T is conventionally configured with an IC chip Ta and a communication antenna Tb and is protected by a film layer J which covers the whole.

A label application device applies the label L, to which the RFID tag T is fixed, to an article. A conventional label application device, for example, proposed previously by the present applicant/assignee hereof, is disclosed in Japanese Patent Application Laid-Open No. 2005-104521. This label application device conveys a label L, which is tacked on a backing paper D, and draws the label L at a predetermined attachment point by means of a attachment plate after the label L is peeled from the backing paper D and the device applies the label L, which is then drawn by the attachment plate, to an article at a predetermined application point on the article.

A conventional label L fixed with the RFID tag, capable of maintaining a regular communication range, is also provided as described in FIG. 16. For example, the label L thereof comprises three portions 10, 11 and 12 which are foldable. The portion 10 is provided with an IC chip Ta and a communication antenna Tb. The portion 11 and 12 are provided with the communication antenna Tb respectively. The label, which the foldable portion 10, 11 and 12 are faced to each surface of an article at a corner thereof, is applied to the article. The communication in the tri-direction is made thereby. (Japanese Patent Application Laid-Open No. 2003-212348)

Incidentally, in a UHF RFID tag T in the conventional label L, if the material or content of an article to which the label L is applied disturbs the electromagnetic wave, in other words, if the material or content contains metal, water or the like, although depending on the frequency, the problem was that the electromagnetic wave is absorbed into the article due to the influence of the metal or liquid such as water in the article, or that a reader/writer cannot read or write the information of the IC chip Ta due to a disturbance in the electromagnetic wave caused by diffuse reflection.

For the solution to this problem, as described in FIG. 17, there has been known a label L, for example, which is provided with hollow tubes 20 for serving a gap between the label L and the article W and is applied to an article W, and the influence coming from the article W, to which the label L is applied, can be minimized by leaving space between the RFID tag T and the article W. (Japanese Patent Application Laid-Open No. 1999-240523)

Japanese Patent Application Laid-Open No. 2005-104521
Japanese Patent Application Laid-Open No. 2003-212348
Japanese Patent Application Laid-Open No. 1999-240523

However, the label L, disclosed in Japanese Patent Application Laid-Open No. 1999-240523, is applied to an article W through the intermediary of the hollow tubes 20, the problem was that the hollow tubes 20 were needed.

According to Japanese Patent Application Laid-Open No. 1999-240523, in a method for fixing the label L on an article, the hollow tubes 20 are fixed on the article by means of an adhesive or a cellophane tape after the label L is applied onto the hollow tubes 20. The conventional label application device is not adaptable for such method, further in case that the method is made under manual operation, the problem was that the operation was onerous and inefficient.

Further, the problem was taken into consideration that the label L applied to the article through the hollow tubes 20 may be come off from the article when the hollow tubes 20 are rubbed against other, or that a leaning of articles stacked may occur by the hollow tubes 20 as projection.

The present invention was developed with an object for resolving the above problems. An object of the present invention is to provide a RFID label application method for applying a label to an article, a RFID label application device thereof and a RFID label, wherein the RFID label is fixed with a RFID tag which is partially separable from the article without a special member. The influence on the RFID tag from the article, to which the RFID tag is applied, can be reduced. Further, efficient label application to the article can be made.

SUMMARY OF THE INVENTION

A label application means of the present invention is to apply a label to an article. The label is tacked on a backing paper and the label is fixed with a tag-fixed portion fixed with a RFID tag comprising an IC chip and a communication antenna and the tag-fixed portion is provided with a side articulated with common label portion and the label is provided with a partition line for partitioning into the tag-fixed portion and the common label portion. The label application means comprises folding means for folding the tag-fixed portion to be raised from the common label portion along the side articulated with the common label portion or along the partition line, and the label is applied to an article.

The tag-fixed portion of the label applied to a surface of the article is foldable to be raised from the article along the partition line, whereby the influence on the RFID tag from the article, to which the RFID tag is applied, can be reduced.

A label application means of the present invention is to apply a label to an article. The label is tacked on a backing paper and the label is fixed with a tag-fixed portion fixed with a RFID tag comprising an IC chip and a communication antenna and the tag-fixed portion is provided with a side articulated with common label portion comprising a first label portion and a second label portion and the label is provided with a partition line for partitioning into the tag-fixed portion and the first label portion of the common label portion. The label application means comprises associating means for associating the first label portion of the common label portion with a first surface of the article such that the partition line of the label follows a corner line of a corner portion of the article, and the label is applied to the article such that the tag-fixed portion, which is articulated with the first label portion, is raised from the article.

The partition line for partitioning into the tag-fixed portion and the common label portion follows the corner line of the article and then the common label portion of the label is applied to the article, thereby the tag-fixed portion is raised from the article. Accordingly, an operation for raising the tag-fixed portion is not needed and operating efficiency can be improved.

A label application means of the present invention is to apply a label to an article. The label is tacked on a backing paper and the label is fixed with a tag-fixed portion fixed with a RFID tag comprising an IC chip and a communication antenna and the tag-fixed portion is partitioned from common label portion and the tag-fixed portion is provided with a side articulated with the common label portion and other sides separable from the common label portion and the label is partitioned into a first label portion articulated with the tag-fixed portion and a second label portion, from which the tag-fixed portion is separable, along the partition line extending across the common label portion from a side of the tag-fixed portion. The label application means comprises associating means for associating the first label portion of the common label portion with a first surface of the article such that the partition line of the label follows a corner line of a corner portion of the article; and the label is applied to the article such that the tag-fixed portion articulating with the first label portion is raised from the article.

The label which is folded along the partition line is applied to the article and the tag-fixed portion is raised from the article, whereby an operation for raising the tag-fixed portion is not needed and operating efficiency can be improved.

A label application device of the present invention applies a label to an article. The label is tacked on a backing paper and the label is fixed with a tag-fixed portion fixed with a RFID tag comprising an IC chip and a communication antenna and the tag-fixed portion is partitioned from common label portion and the tag-fixed portion is provided with a side articulated with the common label portion and other sides separable from the common label portion and the common label portion is partitioned into a first label portion articulated with the tag-fixed portion and a second label portion, from which the tag-fixed portion is separable, along the partition line extending across the common label portion from a side of the tag-fixed portion. The application device comprises an attachment plate operable for drawing the label, and an attachment plate transfer mechanism operable for moving the attachment plate in a range from an attachment point for drawing the label to an application point for applying the label such that the first or the second label portion of the label, which partition line follows a corner line of the article, is faced to the associated first or second surface of the article, and a folding and applying mechanism operable for folding the first or the second label portion along the partition line after the first or the second label portion is applied by the attachment plate and operable for applying the first or the second label portion of the label to the associated first or the second surface of the article, such that the tag-fixed portion is raised from the article.

The label fixed with the RFID tag, which is drawn by the attachment plate, is transferred by means of the attachment plate transfer mechanism from an attachment point for drawing the label to an application point for applying the label to the article. Further, the label, which the first or the second label portion is folded along the partition line, is applied to the article, whereby the tag-fixed portion is partially separable from the article without special members and the influence on the RFID tag from the article to which the RFID tag is applied can be reduced. Further efficient label application to the article is made.

The attachment plate is made in a shape, when the first or the second label portion is folded by the folding and applying mechanism, that the tag-fixed portion which maintains to be flush with the first label portion is movable therethrough in accordance with a motion of the first label portion or, that the folding and applying mechanism is movable to fold the second label portion and apply thereof to the second surface of the article, such that the tag-fixed portion is raised from the article.

By means of the folding and applying mechanism, when the first label portion is folded, the tag-fixed portion, which maintains to be flush with the first label portion, is movable through a pass window provided on the attachment plate in accordance with the first label portion, and the tag-fixed portion can be raised from the label which is pressed by the attachment plate. On the other hand, when the second label portion is folded, the folding and applying mechanism is movable through the pass window provided on the attachment plate and the second label portion is applied to the second surface of the article by folding thereof. Here at, the label, which tag-fixed portion is drawn by the attachment plate, can be applied certainly.

The folding and applying mechanism comprises a revolvable roller operable for revolving along a surface of the article, and a holder operable for holding the roller to be revolvable, and a driving mechanism operable for moving the holder in a range from a backward position to a forward position and the roller, which is pressed over the first or the second label portion of the label in accordance with forward moving of the holder, is revolvable along the first or the second surface of the article, such that the tag-fixed portion is raised from the article.

The mechanism is simplified by using inexpensive members and the label application is assured by using the roller.

The holder is movable in accordance with the attachment plate during the attachment plate is moved from the attachment point of the label to the application point of the label, and the holder is arranged with an attachment mechanism for drawing the label, and an attachment surface of the holder is flush with an attachment surface of the attachment plate when the holder is in backward position, and the roller, which is laid in between the attachment plate and the holder during the attachment plate is moved from the attachment point to the application point, is arranged on the holder next to the attachment plate.

The attachment surface of the holder provided with the attachment mechanism is flush with the attachment surface of the attachment plate, and the roller is arranged therebetween. Accordingly, the label is certainly drawn and held, then applied to the article by avoiding oblique application of the label.

The RFID label is tacked on a backing paper and the RFID label is fixed with a tag-fixed portion fixed with a RFID tag comprising an IC chip and a communication antenna, the RFID label comprises a tag-fixed portion provided on a side articulated with a common label portion, and a partition line for partitioning into the tag-fixed portion and the common label portion; and the tag-fixed portion is foldable along the partition line to be raised from the RFID label.

The RFID label which the RFID tag is partially separable from the article without a special member is applied to the article, whereby the influence on the RFID tag from the article, to which the RFID tag is applied, can be reduced.

The RFID label is provided with the tag-fixed portion fixed with the RFID tag and the tag-fixed portion, having a predetermined size, is partitioned from a common label portion, the tag-fixed portion is provided with a side articulated with the common label portion and other sides separable from the common label portion and the RFID label is partitioned into a first label portion articulated with the tag-fixed portion and a second label portion, from which the tag-fixed portion is separable, along the partition line extending across the common label portion from a side of the tag-fixed portion and the first label portion or the tag-fixed portion is folded when the label application is made to the article, whereby the tag fixed portion is raised from the common label portion.

The RFID label which the RFID tag is partially separable from the article without a special member is applied to the article, whereby the influence on the RFID tag from the article, to which the RFID tag is applied, can be reduced.

The tag-fixed portion is provided with the other sides, articulated with the common label portion, comprising perforations or slits.

The tag-fixed portion is easily separable from the common label portion when the tag-fixed portion is raised from the article.

The RFID label comprises a substrate which the tag-fixed portion is flush with the common label portion and comprises a rigid substrate or a rigid thickness to be raised from the article.

The back surface of the RFID label is provided with a sheet-like reinforced substrate having rigidity capable of raising the tag-fixed portion, which is flush with the common label portion, from the article, and the sheet-like reinforced substrate is laid over a side of the tag-fixed portion.

The back surface of the RFID label is provided with a reinforced substrate having rigidity capable of raising the tag-fixed portion, which is flush with the common label portion, from the article and the reinforced substrate is laid on the tag-fixed portion and a part of the common label portion articulated therewith.

In accordance with above, the tag-fixed portion can be raised and the shape thereof is certainly maintained, whereby the improvement in protecting the RFID tag against an exogenous shock is made.

The tag-fixed portion is laid on a corner portion of the RFID label.

The tag-fixed portion is laid on an intermediate portion of a side of the common label portion of the RFID label.

The back surface of the tag-fixed portion is provided with non-adhesive or weak adhesive. The tag-fixed portion can be raised without sticking on the article when the RFID label is applied thereto, whereby easy handling is served.

According to the present invention, the RFID label is applied to an article such that the tag-fixed portion is raised from the article. The tag-fixed portion is partially separable from the article without a special member, whereby if the material or content of the article contains metal, water or the like which disturbs the electromagnetic wave, the influence on the RFID tag from the article to which the RFID tag is applied can be reduced and certain information transmission and reception is made. Further, efficient label application to the article is made.

BRIEF DESCRIPTION OF THE DRAWINGS

FIG. 2a is a plan view of the label and FIG. 2b is a cross-section view of the label.

FIG. 10a is a plan view of the label and FIG. 10b is a cross-section view of the label.

DESCRIPTION OF THE PREFERRED EMBODIMENTS

Hereinafter, a RFID label application method for applying a label to an article, a RFID label application device thereof and a RFID label according to embodiments of the present invention are described based on figures.

Figure 1:
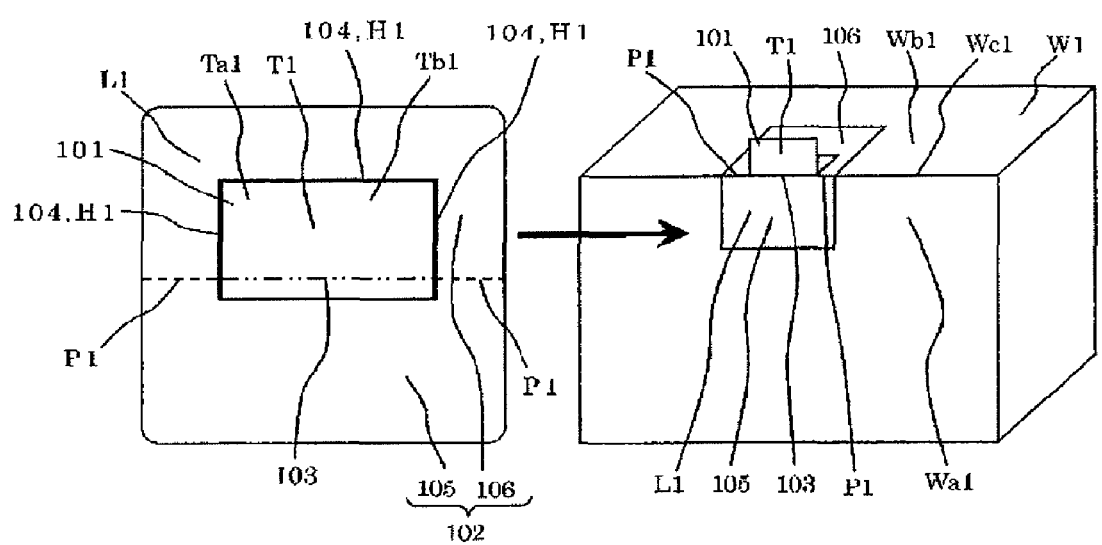
FIG. 1 is a view showing a label used for a label application device and the applying state thereof, related to a first embodiment of the present invention.
Figure 2:
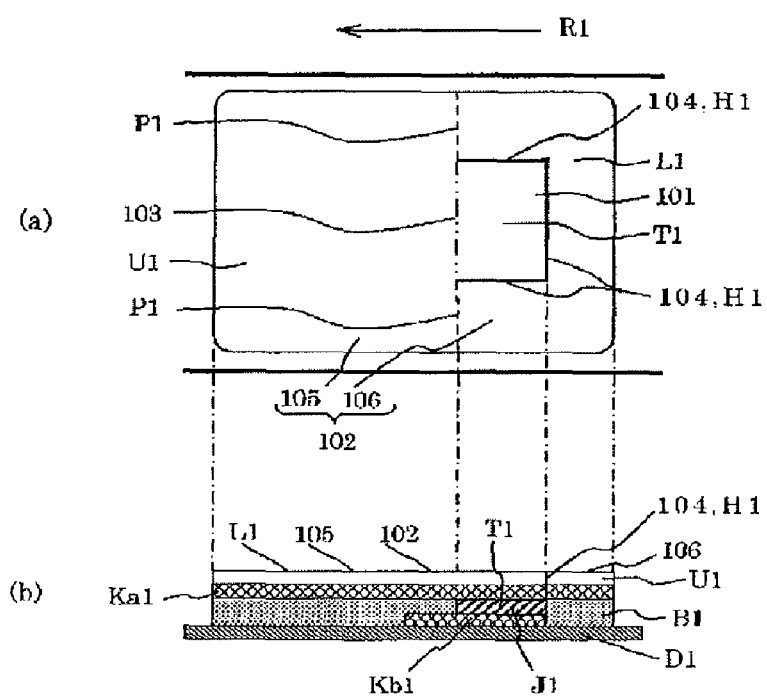
FIG. 2 is a view showing the label used for the label application device of the first embodiment of the present invention.

FIG. 1 and FIG. 2 are views showing a Label L1 used for the label application device related to a first embodiment of the present invention.

The back surface of a display Layer U1 of the Label L1 is provided with a sheet-like reinforced substrate Ka1 and Kb1 having rigidity so it is capable of raising the tag-fixed portion 101, which is flush with a first label portion 105 of a common label portion 102, from a corner portion WC1 of an article W1.

The reinforced substrate Ka1 is made in a shape of same size as the display layer U and is adhered thereon. The back surface of the reinforced substrate Ka1 is provided with a RFID tag T1 and an adhesive layer B1.

The RFID tag T1 comprising an IC chip Ta1 and a communication antenna Tb1 is entirely covered with a film layer J1.

The tag-fixed portion 101 and a part of a common label portion 102 articulated with the tag-fixed portion 101 are provided with the reinforced substrate Kb1 laid on the back surface of the RFID tag T1.

The reinforced substrate Ka1 and Kb1 comprise a resin film substrate, a synthetic paper substrate or the like, whereby the rigidity of the tag-fixed portion for maintaining the shape thereof is increased and a protective feature against an exogenous shock can be improved so that the tag-fixed portion 101 can be laid to protrude from the article W1.

The Label L1, which is made in a shape of long rectangle in the feed direction R of the backing paper D1, is folded at a corner portion Wc1 of the article W1 and is applied to a first surface Wa1 of the article W1 and a second surface Wb1 of the article W1.

The tag-fixed portion 101 fixed with the RFID tag T1 and made in a shape of a rectangle having a predefined size is partitioned from the common label portion 102. Further, the tag-fixed portion 101 surrounded by the common label portion 102 is laid on the intermediate portion of the label L1, and each side thereof is laid in parallel with outer each side of the label L1.

The tag-fixed portion 101 is provided with a side or side edge 103 and other sides or side edges 104 wherein the side 103, which is downstream in the feed direction R1 of the backing paper D1, is articulated with the common label portion 102. The other sides 104 are provided with perforations H1 so as to be separable from the common label portion 102. The tag-fixed portion 101 is raised from the common label portion 102 by folding the common label portion 102 when the Label L1 is applied to the article W1.

The common label portion 102 is partitioned into a first label portion 105 articulated with the tag-fixed portion 101 and a second label portion 106, from which the tag-fixed portion 101 is separable, along a partition line P1 which extends across the common label portion 102 from the side 103 of the tag-fixed portion 101, and the common label portion 102 is foldable along the partition line P1. As described in FIG. 1, the first label portion 105 and the second label portion 106 of the common label portion 102, which are associated with the first surface Wa1 and the second surface Wb1 of the article W1 respectively, are folded along the partition line P1 which follows a corner portion Wc1 of the article W1 and are applied thereto, such that the tag-fixed portion 101, which is flush with the first label portion 105, is raised from the corner portion Wc1 of the article W1.

The back surface of the tag-fixed portion 101 is provided with no adhesive. The backing paper D1 is provided with perforations in accordance with outline box of the tag-fixed portion 101 to avoid sticking on a portion of the article W1, whereby the tag-fixed portion 101 tacked on the backing paper D1 is raised from the article W1. In addition, the back surface of the tag-fixed portion, provided with dot matrix adhesive, is also available, however the back surface of the tag-fixed portion 101, comprising no adhesive, is rather preferable in that the tag-fixed portion 101 can be easily raised from the article W1 when the label L1 folded along the corner portion Wc1 of the article W1 is applied to the article W1.

Figure 4:
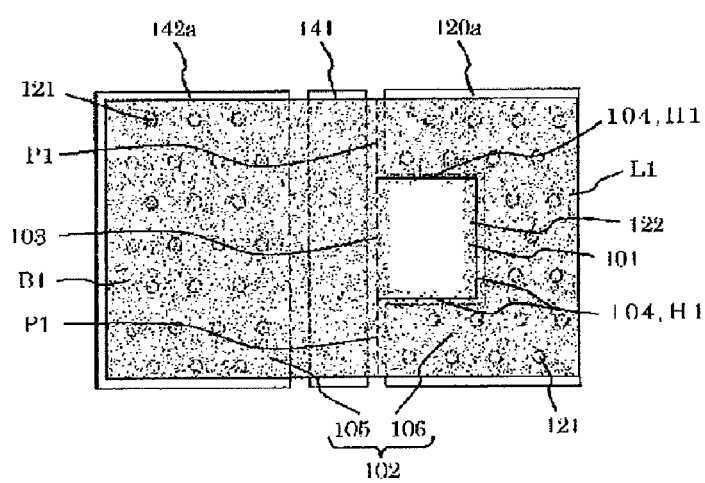
FIG. 4 is a bottom view showing chief part of the label application device described in FIG. 3.
Figure 5:
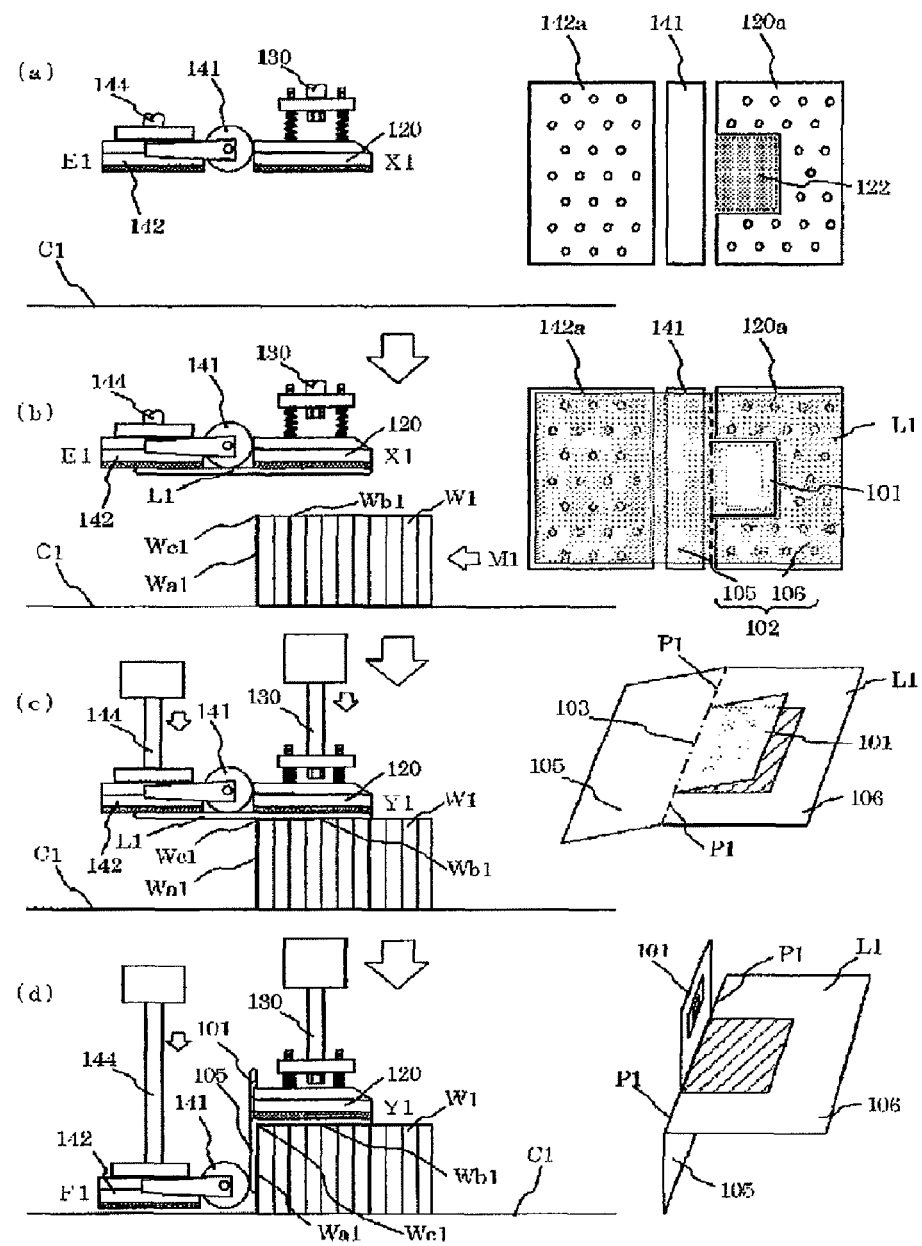
FIG. 5 is a process drawing showing an operating state of the label application device described in FIG. 3 when the label is applied.

Hereinafter, the label application device with the above label application to a first embodiment of the present invention is described. As described in FIG. 3 to FIG. 5, the label application device S1 applies the label L1 to the front portion of the article W1 conveyed by a conveyer C1 in the feed direction M1. In other words, the label L1, which is folded to associate with the first surface Wa1 and the second surface Wb1 along the corner portion Wc1 laid in the front of the article W1, is applied to the article W1.

The label application device S1 is provided with a label feed mechanism 110 which feeds the backing paper D1 tacked on the label L1 supplied from a label roll 111 and peels the label L1 off from the backing paper D1 by folding the backing paper D1 back at a peel plate 112. The backing paper D1 folded back is rewound by a reel 113. A reader/writer 114 for reading and writing information in the RFID tag T1 is arranged in the front of the peel plate 112.

Further, the label application device S1 is provided with an attachment plate 120 having numbers of pores 121 for drawing a display layer U1 of the label L1 by air.

The attachment plate 120 is made in a reentrant shape capable of drawing the second label portion 106 of the common label portion 102 of the label L1 peeled by the peel plate 112, except the tag-fixed portion 101 fixed with the RFID tag T1. Herewith, a pass window 122, which the tag-fixed portion 101 can pass through to be flush with the first label portion 105 when the first label portion 105 is folded by means of the folding and applying mechanism, is laid on the attachment 120 at the end and center position to the feeding direction of the label L1.

Further, the label application device S1 is provided with an attachment plate transfer mechanism 130 for moving the attachment plate 120 in a movable range between an attachment point X1 (FIG. 3 and FIG. 5b) for drawing the label L1 and an application point Y1 (FIG. 5c) for applying the second label portion 106 of the label L1 onto the second surface Wb1 of the article W1 such that the partition line P1 of the label L1 follows the corner portion Wc1 of the article W1.

Figure 3:
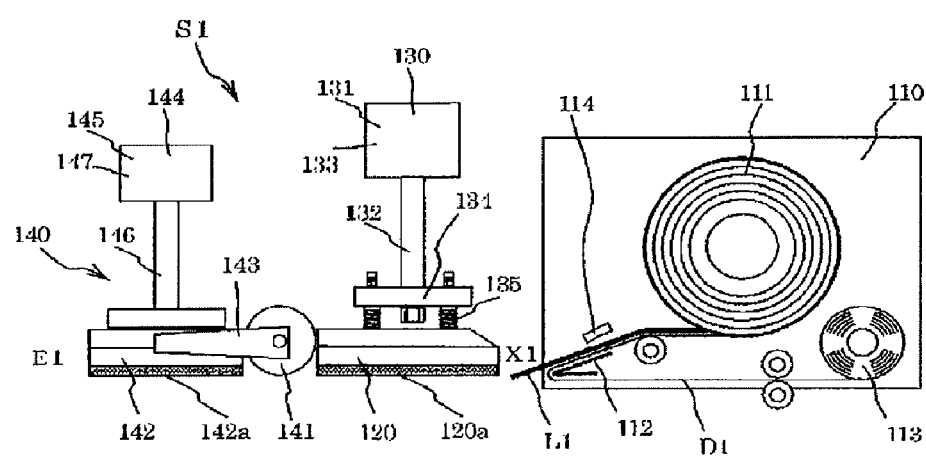
FIG. 3 is a view showing the label application device of the first embodiment of the present invention.

As described in FIG. 3, the attachment plate transfer mechanism 130 comprises an air cylinder device 131, a piston 132 on which a base plate 134 for supporting the attachment plate 120 is attachable, and a cylinder 133 on a machinery mounting. The attachment plate 120 is supported by the base plate 134 through a coil spring 135 for absorbing an impact.

Further, the label application device S1 is provided with a folding and applying mechanism 140 capable of folding the first label portion 105 of the label L1 along the partition line P1 and capable of applying the first label portion onto the first surface Wa1 of the article W1 after the application of second label portion 106 of the label L1 is made by the attachment plate 120.

The folding and applying mechanism 140 comprises a roller 141 revolvable along the first surface Wa1 of the article W1, a holder 142 for holding the roller 141 to be revolvable, and a driving mechanism 144, which moves the holder 142 in a movable range between a backward position E1 (FIG. 3 and FIG. 5b) and a forward position F1 (FIG. 5d), for pressing and revolving the roller 141 on the first label portion 105 of the label L along the first surface Wa1 of the article W1 in the forward position F1 of the holder 142.

The holder 142, which is movable in the movable range from the attachment point X1 to the application point Y1 in accordance with the attachment plate 120, as in the case of the attachment plate 120, is arranged with the attachment mechanism provided with numbers of pores 121 for drawing the label L1 by air. As described in FIG. 3 and FIG. 5b, an attachment surface 142a of the holder 142 is positioned to be flush with the attachment plate 120a of the attachment plate 120 when the holder 142 is in the backward position E1. Further, the roller 141, which is positioned in between the attachment plate 120 and the holder 142 during the attachment plate 120 move from the attachment point X1 to the application point Y1, is arranged to be revolvable on the holder 142 next to the attachment plate 120 through an arm 143.

As described in FIG. 3, the driving mechanism 144 comprises an air cylinder device 145, a piston 146 which the holder 142 is attachable thereon, and a cylinder 147 on a machinery mounting. The air cylinder device 145, when the holder 142 is moved from the backward position E1 to the forward position F1, is activated to move in accordance with a motion of the attachment plate 120 from the attachment point X1 to the application point Y1.

Hereinafter, the application method with the label L1 by means of the label application device S1 is described.

As described in FIG. 3, FIGS. 5a and 5b, the article W1 is conveyed on the conveyer C1. The label L1 fed by means of the label feed mechanism 110 is peeled off from the backing paper D1 by folding the backing paper D1 back at a peel plate 112 and is drawn by the attachment plate 120 at the attachment point X1. In this state, the attachment plate 120 draws the second label portion 106 of the common label portion 102 except the tag-fixed portion 101 fixed with the RFID tag T1 and the holder 142 draws the first label portion 105 of the common label portion 102 of the label L1.

Next, as described in FIG. 5c, the air cylinder device 131 of the attachment plate transfer mechanism 130 and the air cylinder device 145 of the driving mechanism 144 are activated to move both the attachment plate 120 and the holder 142 together when the article W1 on the conveyer C1 comes in the predefined position. The attachment plate 120 is moved from the attachment point X1 to the application point Y1 and the air cylinder device 145 of the driving mechanism 144 moves the holder 142 to the forward position F1.

Herewith, the second label portion 106 of the label L1 is applied onto the second surface Wb1 of the article W1 such that the partition line P1 of the common label portion 102 of the label L1 follows the corner portion Wc1 of the article W1.

Thereafter, as described in FIG. 5d, the air cylinder device 145 of the driving mechanism 144 continues its activation to move the holder 142 to the forward position F1, so that the roller 141 revolves along the first surface Wa1 of the article W1 over the first label portion 105 of the label L1. Thereby, the first label portion 105 of the label L1 is folded along the partition line P1 and is applied onto the first surface Wa1 of the article W1.

In this case, the tag-fixed portion 101, which is maintainable to be flush with the first label portion 105, having rigidity capable of being raised from the corner portion Wc1 of the article W1 can pass through the pass window 122 provided on the attachment plate 120 in accordance with the motion of the first label portion 105 and the tag-fixed portion 101 is then raised from the common label portion 102. In other words, the tag-fixed portion 101 upstands at the corner portion Wc1 of the article W1 to protrude from the article W1.

After the application of the label L1 is completed, the air cylinder device 131 of the attachment plate transfer mechanism 130 and the air cylinder device 145 of the driving mechanism 144 are activated to move the attachment plate 120 back to the attachment point X1 and move the holder 142 to the backward position E1 respectively.

As described in FIG. 5d, in the situation that the label L1 is applied to the article W1, the tag-fixed portion 101 of the label L1 is raised from the article W1. If the material or content of an article contains metal, water or the like which disturbs the electromagnetic wave, the influence from the article to which the label L1 is applied can be reduced on the tag-fixed portion which is partially separable from the article without a special member. Accordingly, the secured information transfer and receipt between the reader/writer and the IC chip are made and the automation by means of the label application device S1 is made also, whereby efficient label L1 application to the article W1 can be accomplished.

Further, the problem which may arise when articles are stacked can be resolved unless the hollow tube is used.

In addition, the first embodiment of the present invention is provided with the label L1 comprising the reinforced substrate Ka1 and Kb1. Furthermore, the label L1 may comprise either the reinforced substrate Ka1 or the reinforced substrate Kb1, or further may comprise no reinforced substrate according to conditions.

In case the label L1 may comprise no reinforced substrate, the display layer U1 having 70 μm or more as the thickness t is preferable for the paper substrate comprising a quality paper, an art paper or a coated paper, and the display layer U1 having 50 μm or more as the thickness t is preferable for the resin film substrate comprising polyethylene resin (PE), polypropylene (PP), polyethylene terephthalate (PET), polystyrene (PS), polyurethane, or the synthetic paper substrate which is made to a fibriform paper from the polyethylene or polypropylene by adding a packing material. Herewith, the tag-fixed portion 101 can have rigidity for raising the tag-fixed portion 101, which is flush with the first label portion 105, from the corner portion Wc1 of the article W1. The substrate and the thickness described in above are appropriately changeable.

Figure 6:
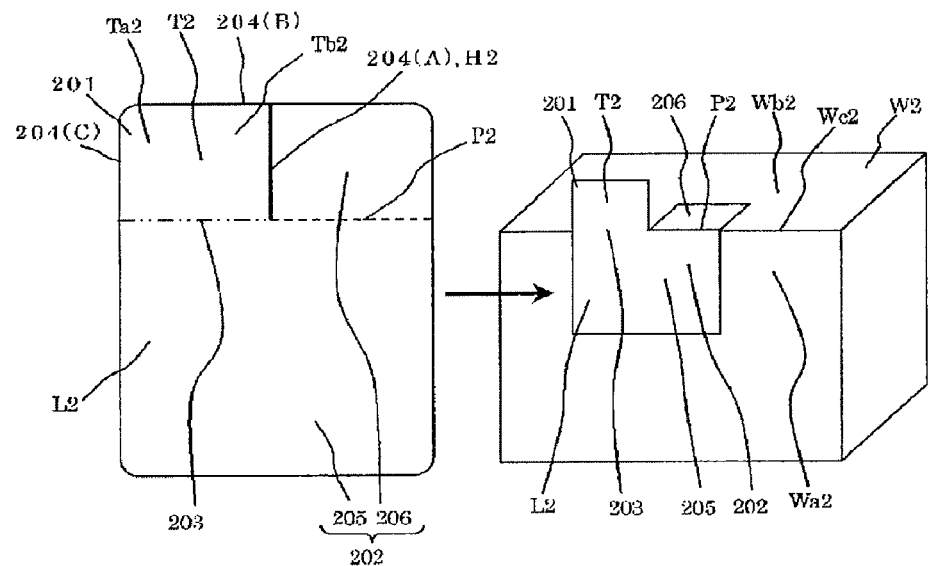
FIG. 6 is a view showing a label used for a label application device and the applying state, related to a second embodiment of the present invention.

FIG. 6 is a view showing a label L2 used for the label application device of a second embodiment of the present invention.

The label L2 is substantially same as the label L1 shown in the first embodiment of the present invention but is different from the label L1 in that a tag-fixed portion 201 is provided on a corner portion of the label L2 which has outer sides that run in parallel with each side of the tag-fixed portion 201.

The tag-fixed portion 201 comprises a side 203 articulated with a common label portion 202, one other side 204(A) tacked on the common label portion 202 and two other sides 204(B, C) for outer side of the label L2, which are separable from the common label portion 202, and the tag-fixed portion 201 is raised from the common label portion 202 by folding the common label portion 202 when the application to an article W2 is made. The other side 204(A) tacked on the common label portion 202 is provided with perforations H2.

The common label portion 202 is partitioned into a first label portion 205 articulated with the tag-fixed portion 201 and a second label portion 206, which the tag-fixed portion 201 is separable therefrom, along a partition line P1 extending across the common label portion 202 from the side 203 of the tag-fixed portion 201 and the common label portion 202 is foldable along the partition line P2.

As described in FIG. 6, the first label portion 205 and the second label portion 206 of the common label portion 202, which are associated with the first surface Wa2 and the second surface Wb2 of the article W2 respectively, are folded along the partition line P2 which follows a corner portion Wc2 of the article W2 and are applied thereto, such that the tag-fixed portion 201, which is flush with the first label portion 205, is raised from the corner portion Wc2 of the article W2.

The back surface of the tag-fixed portion 201 is provided with no adhesive, whereby the fixed-portion 201 can be easily raised from the article W2 when the label L2 folded along the corner portion Wc2 of the article W2 is applied to the article W2.

Hereinafter, the label application device according to the second embodiment of the present invention is described in detail based on figures.

Figure 7:
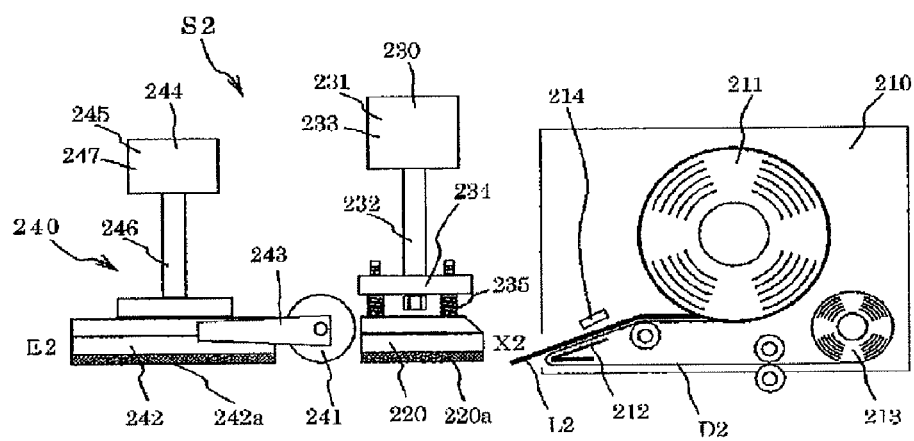
FIG. 7 is a view showing the label application device of the second embodiment of the present invention.
Figure 8:
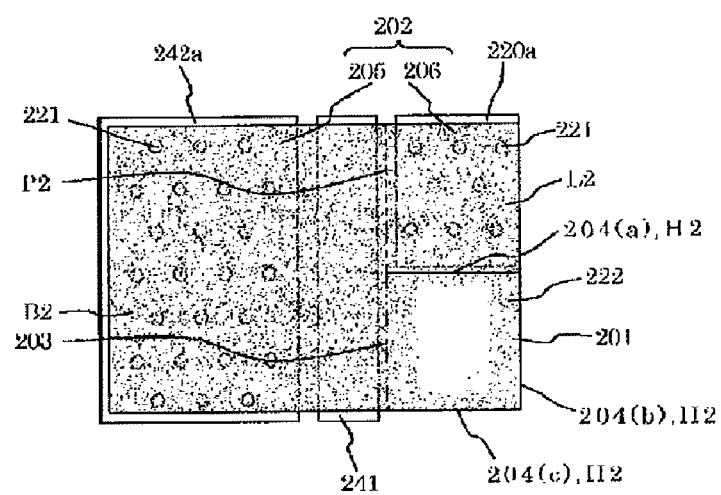
FIG. 8 is a bottom view showing chief part of the label application device described in FIG. 7.
Figure 9:
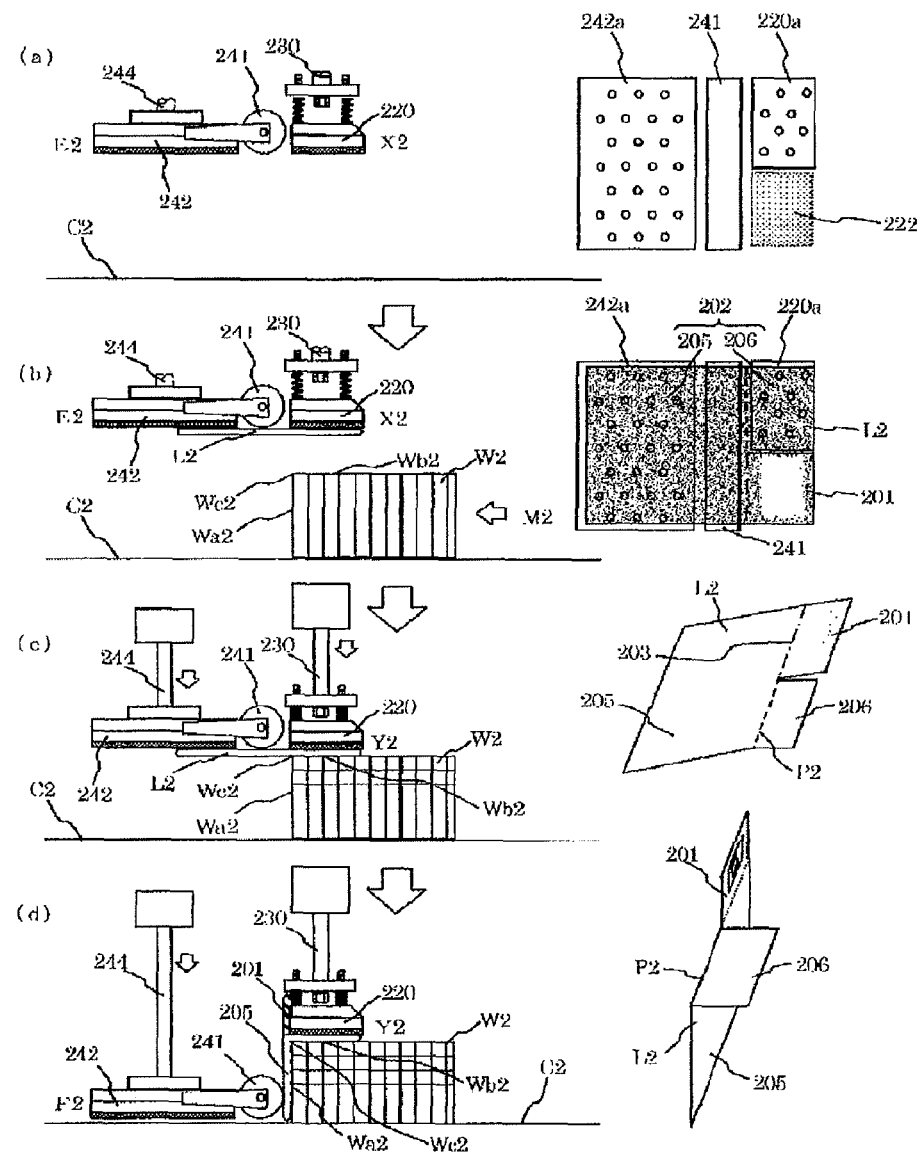
FIG. 9 is a process drawing showing an operating state of the label application device described in FIG. 7 when the label is applied.

As described in FIG. 7 to FIG. 9, the label application device S2 is substantially same as the label application device S1 but for an attachment plate 220.

As described in FIG. 7 to FIG. 8, the attachment plate 220 is made in a rectangle shape capable of drawing the second label portion 206 of the common label portion 202 of the label L2 peeled by the peel plate 212, except the tag-fixed portion 201 fixed with the RFID tag T2.

Herewith, a pass window 222, which the tag-fixed portion 201 can pass through to be flush with the first label portion 205 when the first label portion 205 is folded by means of the folding and applying mechanism 240, is laid lateral to the attachment 220.

Other composition than above is substantially same as the label application device S1.

Hereinafter, the application method with the label L2 by means of the label application device S2 is described.

As described in FIG. 7, FIGS. 9a and 9b, the article W2 is conveyed on the conveyer C2. The label L2 fed by means of the label feed mechanism 210 is peeled off from the backing paper D2 by folding the backing paper D2 back at a peel plate 212 and is drawn by the attachment plate 220 at the attachment point X2. In this state, the attachment plate 220 draws the second label portion 206 of the common label portion 202 except the tag-fixed portion 201 fixed with the RFID tag T2 and the holder 242 draws the first label portion 205 of the common label portion 202 of the label L2.

Next, as described in FIG. 9c, the air cylinder device 231 of the attachment plate transfer mechanism 230 and the air cylinder device 245 of the driving mechanism 244 are activated to move both the attachment plate 220 and the holder 242 together when the article W2 on the conveyer C2 comes in the predefined position. Here at, the attachment plate 220 is moved from the attachment point X2 to the application point Y2 and the air cylinder device 245 of the driving mechanism 244 moves the holder 242 to the forward position F2.

Herewith, the second label portion 206 of the label L2 is applied onto the second surface Wb2 of the article W2 such that the partition line P2 of the common label portion 202 of the label L2 follows the corner portion Wc2 of the article W2.

Thereafter, as described in FIG. 9d, the air cylinder device 245 of the driving mechanism 244 continues its activation to move the holder 242 to the forward position F2, so that the roller 241 revolves along the first surface Wa2 of the article W2 over the first label portion 205 of the label L2. Thereby, the first label portion 205 of the label L2 is folded along the partition line P2 and is applied onto the first surface Wa2 of the article W2.

In this case, the tag-fixed portion 201, which is maintainable to be flush with the first label portion 205, having rigidity for being raised from the corner portion Wc2 of the article W2 can pass through the pass window 222 provided with the attachment plate 220 in accordance with the motion of the first label portion 205 and the tag-fixed portion 201 is then raised from the common label portion 202. In other words, the tag-fixed portion 201 upstands at the corner portion Wc2 of the article W2 to be protruded from the article W2.

After the application of the label L2 is completed, the air cylinder device 231 of the attachment plate transfer mechanism 230 and the air cylinder device 245 of the driving mechanism 244 are activated to move the attachment plate 220 to the attachment point X2 and move the holder 242 to the backward position E2 respectively.

As described in FIG. 6 and FIG. 9d, in the situation that the label L2 is applied to the article W2, the tag-fixed portion 201 of the label L2 is raised from the article W2. Accordingly, easy application of the label L2 fixed with the RFID tag to the article W2 by means of the label application device S2 is accomplished.

It should be noted that the first and the second embodiments of the present invention describe both the pass window 222 of the attachment plate 220 and the tag-fixed portion 201 which are made in a rectangle shape, but no limitation is made to this. Thus, the pass window 222 of the attachment plate 220 and the tag-fixed portion 201 may be made in a half circle shape or a trapezoidal shape. Further, other shapes than above may be used therefor appropriately.

The label L2, disclosed in above the first and second embodiments of the present invention, are applied to the front portion of the article W2 conveying on the conveyer C2 in the feed direction M2, but the mounted position of the label application device S1 or S2 may be appropriately changed according to many purposes so that the label L2 can be applied to other corner portion Wc2 which is laid in the back side, lateral side or downside of the article W2.

Hereinafter, a label application device using above label according to the third embodiment of the present invention is described in detail.

Figure 10:
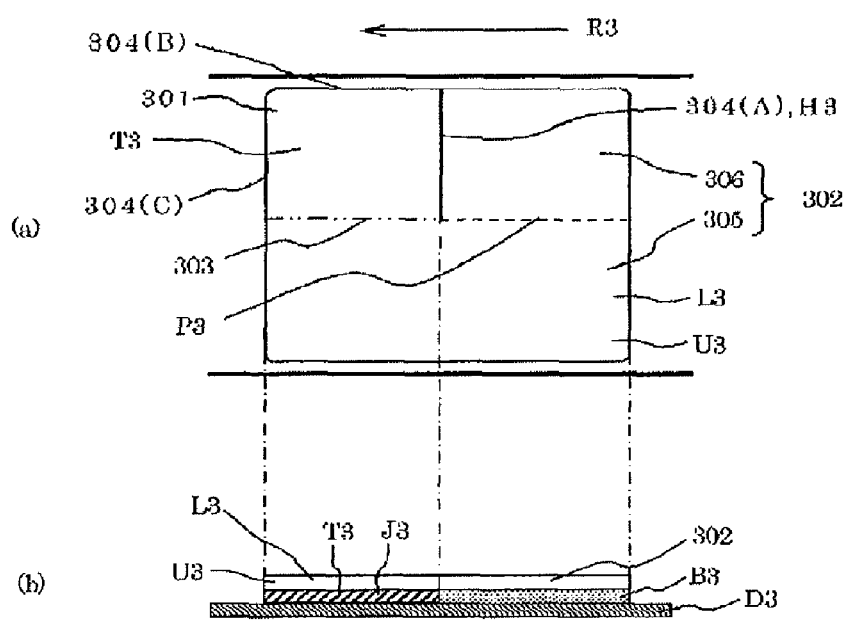
FIG. 10 is a view showing a label for a label application device of a third embodiment of the present invention.

FIG. 10 is a view showing the label L3 used for the label application device of the third embodiment of the present invention. The tag-fixed portion 301 is laid on a corner portion of the label L3 which is substantially same as the label L2 of the second embodiment of the present invention, and each side of the tag-fixed portion 301 runs in parallel with each outer side of the label L3.

Figure 11:
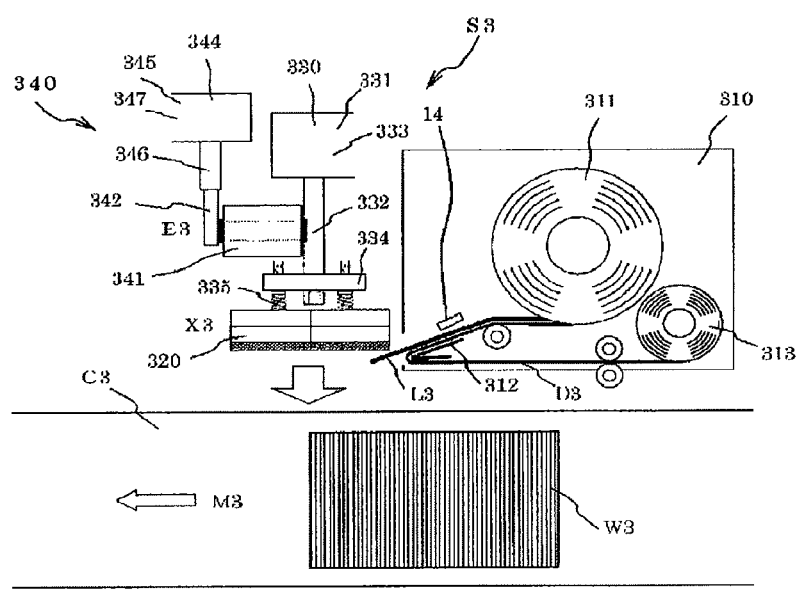
FIG. 11 is a view showing the label application device of the third embodiment of the present invention.
Figure 12:
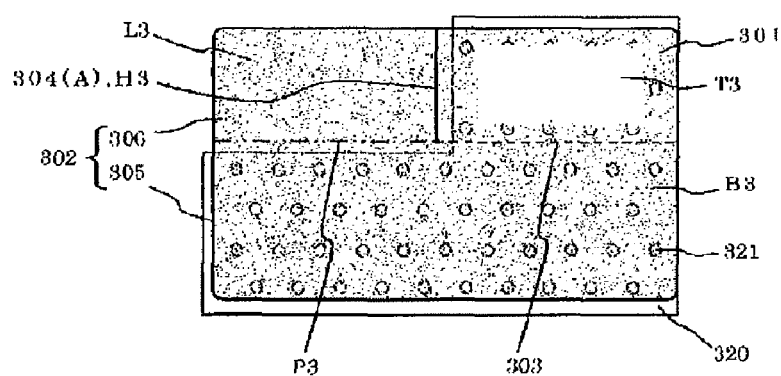
FIG. 12 is a bottom view showing chief part of the label application device of the third embodiment of the present invention.
Figure 13:
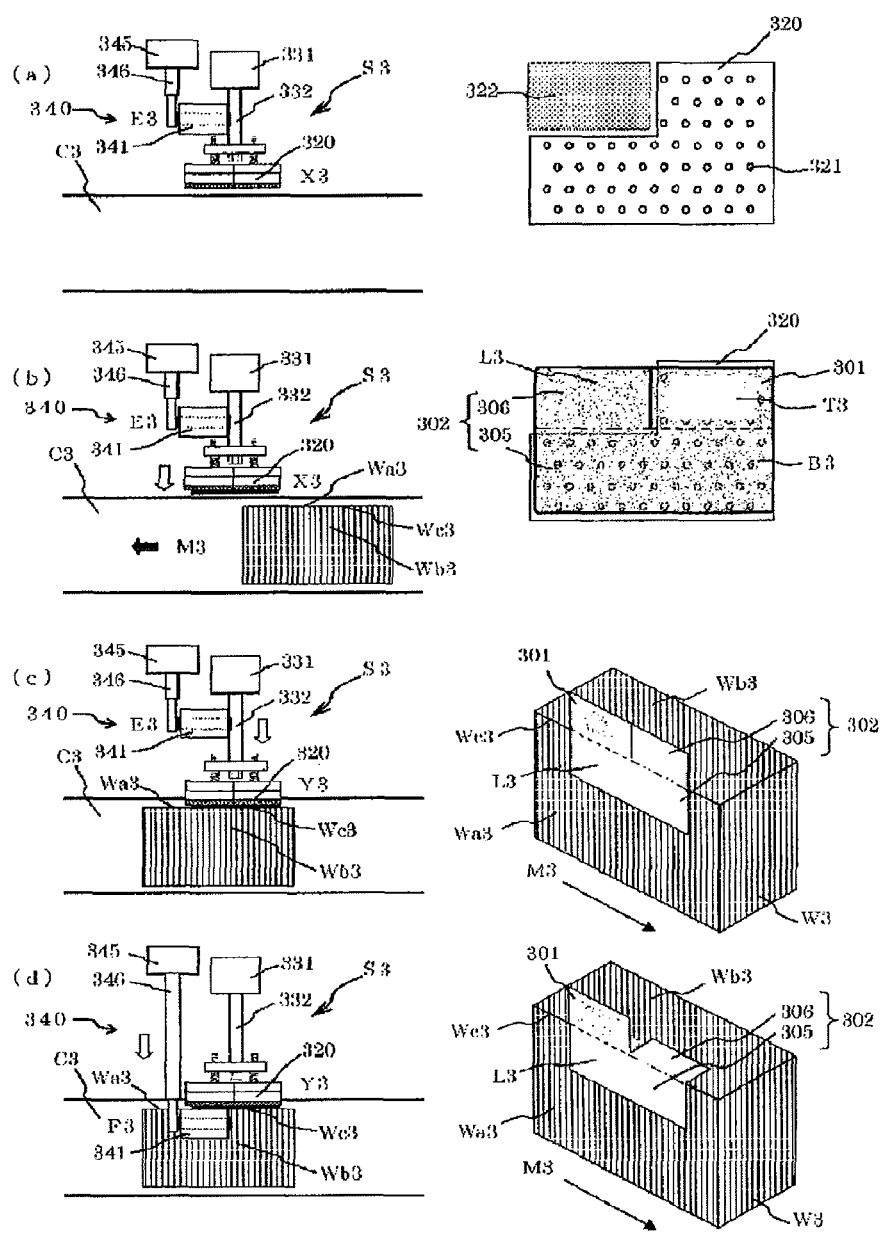
FIG. 13 is a process drawing showing an operating state of the label application device of the third embodiment of the present invention when the label is applied.

As described in FIG. 11 to FIG. 13, the label application device S3 applies the label L3 to the side surface of the article W3 conveyed by a conveyer C3 in the feed direction M3. In other words, a first label portion 305 of common label portion 302 is applied to a first surface Wa3 of a corner portion Wc3 of the article W3 and then a second label portion 306 of the common label portion 302 is applied to a second surface Wb3 of the corner portion Wc3 of the article W3 by folding the second label portion 306.

The label application device S3 is provided with a label feed mechanism 310 comprising same components as described in the first to third embodiments of the present invention.

Further, the label application device S3 is provided with an attachment plate 320 having numbers of pores 321 for drawing a surface of the label L3 by air.

The attachment plate 320 described in FIG. 12, which is different from the attachment plate described in the first and second embodiments of the present invention, is made in a L type shape capable of drawing the tag-fixed portion 301 fixed with a RFID tag T3 and the first label portion 305 of the common label portion 302, except the second label portion 306 of the common label portion 302 of the label L3 peeled by a peel plate 312.

Herewith, a pass window 322 (FIG. 13a), which the folding and applying mechanism can pass through to fold the second label portion 306 of the common label portion 302 of the label L3 and apply thereof to the second surface Wb3 of the corner portion Wc3 of the article W3 of the article W3 when the second label portion 306 is folded by means of the folding and applying mechanism, is laid on the attachment plate 320.

Further, the label application device S3 is provided with an attachment plate transfer mechanism 330 for moving the attachment plate 320 in a movable range between an attachment point X3 (FIG. 11) for drawing the label L3 and an application point Y3 (FIG. 13c) for applying the first label portion 305 of the label L3 onto the first surface Wa3 of the article W3 such that the partition line P3 of the label L3 follows the corner portion Wc3 of the article W3.

As described in FIG. 11, the attachment plate transfer mechanism 330 comprises an air cylinder device 331, a piston 332 on which a base plate 334 for supporting the attachment plate 320 is attachable, and a cylinder 333 on a machinery mounting. The attachment plate 320 is supported by the base plate 334 through a coil spring 335 for absorbing an impact.

Further, the label application device S3 is provided with a folding and applying mechanism 340 capable of folding the second label portion 306 of the label L3 along the partition line P3 and capable of applying thereof onto the second surface Wb3 of the article W3 after the application of the first label portion 305 of the label L3 is made by the attachment plate 320.

The folding and applying mechanism 340 comprises a roller 341 revolvable along the second surface Wb3 of the article W3, a holder 342 for holding the roller 341 to be revolvable, and a driving mechanism 344, which moves the holder 342 in a movable range between a backward position E3 (FIG. 11 and FIG. 13a to FIG. 13c) and a forward position F3 (FIG. 13d), for pressing and revolving the roller 341 on the second label portion 306 of the label L3 along the second surface Wb3 of the article W3 in the forward position F3 of the holder 342.

As described in FIG. 11, the driving mechanism 344 comprises an air cylinder device 345, a piston 346 on which the holder 342 is attachable, and a cylinder 347 on a machinery mounting.

Hereinafter, the application method with the label L3 by means of the label application device S3 is described.

As described in FIG. 11, the article W3 is conveyed on the conveyer C3 in the feed direction M3. The label L3 fed by means of the label feed mechanism 310 is peeled off from the backing paper D3 by folding the backing paper D3 back at a peel plate 312 and is drawn by the attachment plate 320 at the attachment point X3 as described in FIG. 13b. In this state, as described in FIG. 12, the attachment plate 320 draws the tag-fixed portion 301 fixed with the RFID tag T3 of the label L3 and the first label portion 305 of the common label portion 302 of the label L3, except the second label portion 306 of the common label portion 302.

Next, as described in FIG. 13c, the air cylinder device 331 of the attachment plate transfer mechanism 330 is activated to move the attachment plate 320 from the attachment point X3 to the application point Y3. Herewith, the first label portion 305 of the label L3 is applied onto the first surface Wa3 of the article W3 such that the partition line P3 of the common label portion 302 of the label L3 follows the corner portion Wc3 of the article W3.

In this case, the tag-fixed portion 301, which is flush with the first label portion 305, having rigidity capable of being raised from the corner portion Wc3 of the article W3, is maintainable its rising state.

Thereafter, as described in FIG. 13d, the air cylinder device 345 of the driving mechanism 344 continues its activation to move the holder 342 from the backward position E1 to the forward position F1, so that the roller 341 revolves along the second surface Wb3 of the article W3 over the second label portion 306 of the label L3. Thereby, the second label portion 306 of the label L3 is folded along the partition line P3 and is applied onto the second surface Wb3 of the article W3.

After the application of the label L3 is completed, as described in FIG. 13a, the air cylinder device 345 of the driving mechanism 344 is activated to move the holder 342 back to the backward position E3, and the air cylinder device 331 of the attachment plate transfer mechanism 330 is activated to move the attachment plate 320 back to the attachment point X3.

As described in FIG. 13d, in the situation that the label L3 is applied to the article W3, the tag-fixed portion 301 of the label L3 is raised from the article W3.

According to the third embodiment of the present invention, as described in FIG. 13d, in the situation that the label L3 is applied to the article W3, the tag-fixed portion 301 of the label L3 is raised from the article W3. If the material or content of an article contains metal, water or the like which disturbs the electromagnetic wave, the influence from the article to which the label L3 is applied can be reduced on the tag-fixed portion which is partially separable from the article W3 without a special member. Accordingly, the secured information transfer and receipt between the reader/writer and the IC chip Ta3 are made and the automation by means of the label application device S3 is made also, whereby efficient label L3 application to the article W3 can be accomplished.

Further, the problem which may arise when articles are stacked can be resolved unless the hollow tube is used.

In addition, the layer structure of the label L3 related to the third embodiment of the present invention is substantially same as the second embodiment of the present invention, furthermore it goes without saying that the layer structure of the label L3 may comprise the reinforce substrate Ka1 and Kb1, same as the first embodiment of the present invention.

Figure 14:
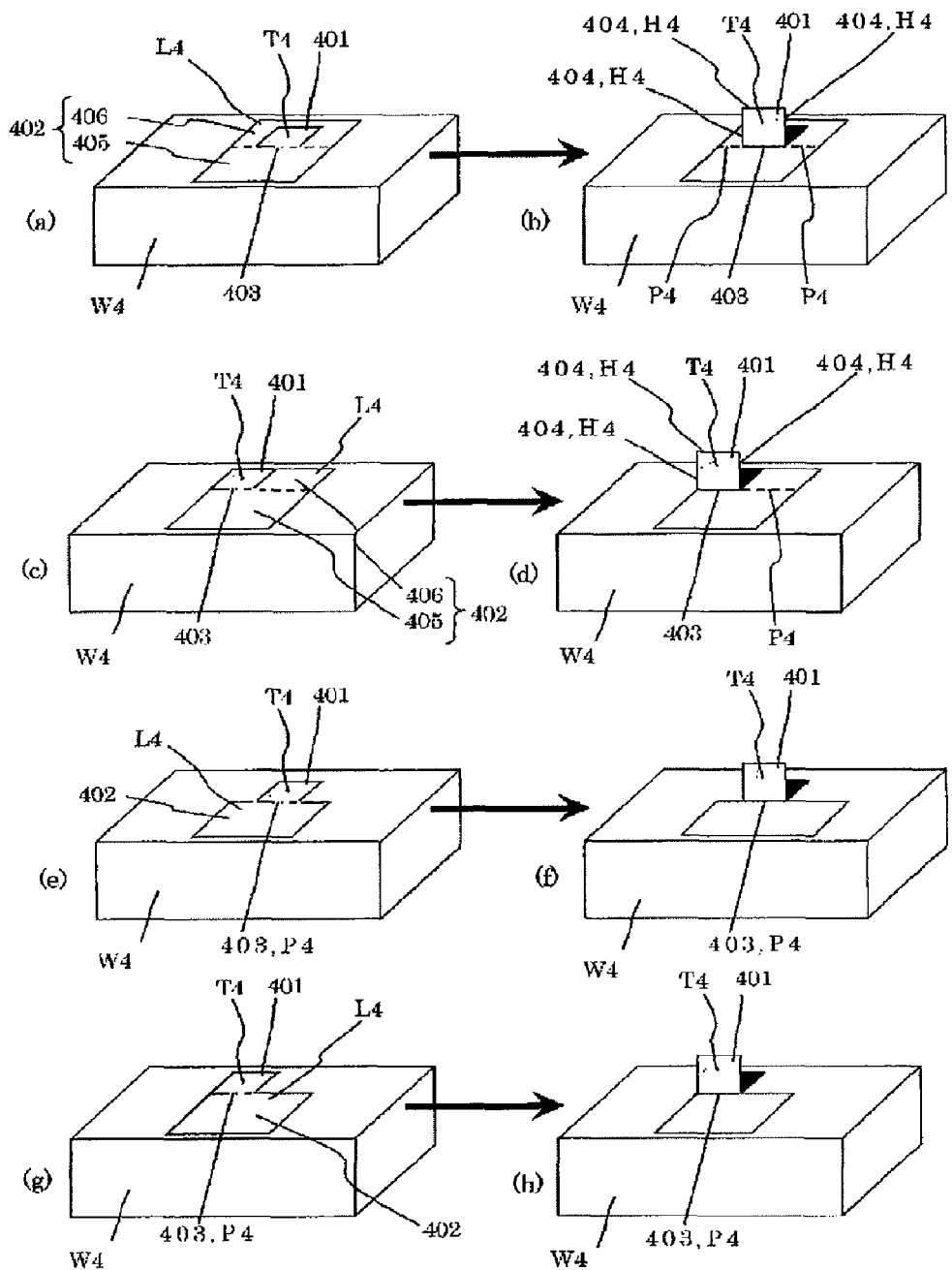
FIG. 14 is a view showing a label and the applying state, related to a fourth embodiment of the present invention.
Figure 15:
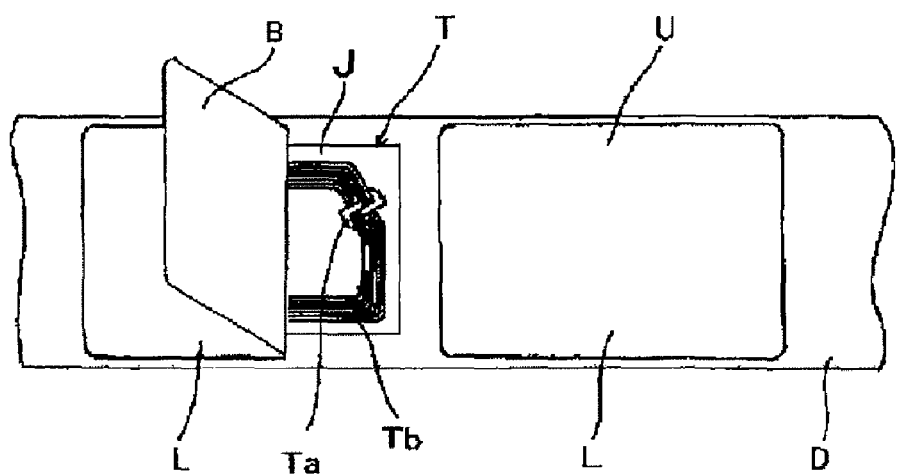
FIG. 15 is a view showing a common example of the label L fixed with a RFID tag T.
Figure 16:
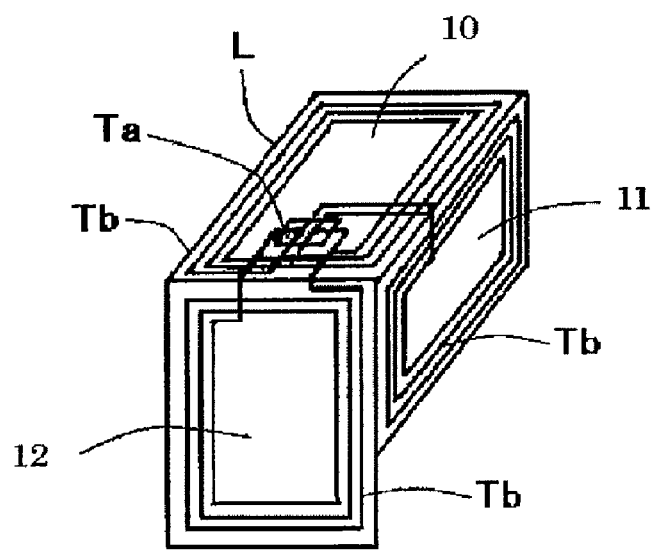
FIG. 16 is a cross-section view showing an application example of a conventional label fixed with a RFID tag.
Figure 17:
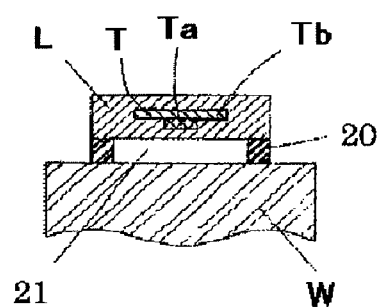
FIG. 17 is a cross-section view showing another application example of the conventional label fixed with the RFID tag.

FIG. 14 is a view showing a label L4 related to a fourth embodiment of the present invention.

The label L4, which is applied onto a flat surface of an article W4, is substantially same as the label L1 to L3 of the first to third embodiments of the present invention.

When the application of the label L4 related to the fourth embodiment of the present invention is made, conventional label application device provided with an attachment plate can be used without any difficulty. With the conventional application device, the label L4 tacked on a backing paper D4 is fed and peeled off from the backing paper D4 by drawing the label L4 at the predefined attachment point and then is applied to an article W4 at the application point.

Further, as described in FIG. 14b to 14d, in the situation that the label L4 is applied to the article W4, the tag-fixed portion 401 is folded along a side 403 to be raised from the common label portion 402. The back surface of the tag-fixed portion 401 is provided with no adhesive, whereby the tag-fixed portion 401 can be easily raised from the article W4.

Accordingly, same function and effect as the label L1 to L3 related to the first to third embodiments of the present invention are achieved.

Further, the label L4, which is available with the conventional label application device, could benefit in improving the operating efficiency by automation.

It should be noted that the tag-fixed portion 401 made in a rectangle shape is described in the fourth embodiment of the present invention, but no limitation is made to this, thus the tag-fixed portion 401 may be made in a half circle shape or a trapezoidal shape, further other shapes than above may be used therefor appropriately.

It should be noted that the tag-fixed portion 401 made in a square label L4, having a side of the tag-fixed portion same length as a side 403 of the common label portion 402, is described in the fourth embodiment of the present invention, but no limitation is made to this, thus as described in FIG. 14*e* to FIG. 14*h*, the label L4 may be made in a convex shaped label or a L shaped label, further the tag-fixed portion 401 may be provided in having at the middle or the corner portion of the side 403 articulated with the common label portion 402.

Further, herewith effectiveness of the label L1 to L4 other than the disclosed in the first to fourth embodiments of the present invention is described. If the intended purpose of the article to which the label is applied is accomplished, the tag-fixed portion 101 to 401 which is raised from the article is easily removed from the label, whereby a disclosure of information stored in an IC chip Ta1 to Ta4 can be easily prevented and the tag-fixed portion including the IC chip Ta1 to Ta4 is easily separable if a packaging material of the article to which the label is applied comprises the recycled materials such as cardboard or the like.

Furthermore, if the tag-fixed portion 101 to 401 capable of being raised is provided with color or fluorescent color, the label can be apparently identified in the circumstances that articles are stacked or that warehouse is darkened, whereby efficient reading operation of information in the label by means of a scanner can be accomplished. Thus, miscellaneous efficiency can be achieved.

What is claimed is:

1. A method of applying a label to an article, wherein the label is tacked on a backing paper, the label is fixed to a tag-fixed portion on which a RFID tag comprising an IC chip and a communication antenna are fixed, the tag-fixed portion has a side edge articulated with a common label portion, and the label has a partition line extending across the common label portion to partition the common label portion between a first label portion with which the fixed tag portion articulates and a second label portion at which the tag fixed portion is positionable; and the partition line also partitioning the label into the tag-fixed portion and the common label portion, the method comprising:

folding the common label portion with respect to the tag-fixed portion to raise the tag fixed portion from the common label portion, the folding being along the side edge of the tag-fixed portion articulated with the common label portion or along the partition line; and then applying the label to the article.

2. A method of applying a label to an article, wherein the label is tacked on a backing paper, the label is fixed to a tag-fixed portion on which a RFID tag comprising an IC chip and a communication antenna are fixed, the tag-fixed portion has a side edge articulated with a common label portion, the label comprising a first label portion, a second label portion, a partition line for partitioning the label into the tag-fixed portion and the first label portion of the common label portion, the method comprising:

associating the first label portion of the common label portion with a first surface of the article and orienting the label such that the partition line of the label follows a corner line of a corner portion of the article; and applying the label to the article such that the tag-fixed portion articulated with the first label portion is raised from the article.

3. A method of applying a label to an article, wherein the label is tacked on a backing paper, the label is fixed to a tag-fixed portion on which a RFID tag comprising an IC chip and a communication antenna are fixed, the tag-fixed portion is partitioned from a common label portion of the label, the tag-fixed portion has a side edge which is articulated with the common label portion and has other side edges that are separable from the common label portion, the label is partitioned into a first label portion articulated with the tag-fixed portion and a second label portion from which the tag-fixed portion is separable, along a partition line extending across the common label portion from a side edge of the tag-fixed portion, the method comprising:

associating the first label portion of the common label portion with a first surface of the article and orienting the label such that the partition line of the label follows a corner line of a corner portion of the article; and applying the label to the article such that the tag-fixed portion articulated with the first label portion is raised from the article.

4. A label application device operable for applying a label to an article, wherein the label is tacked on a backing paper, the label is fixed to a tag-fixed portion on which a RFID tag comprising an IC chip and a communication antenna are fixed, the tag-fixed portion is partitioned from a common label portion and the tag-fixed portion has a side edge articulated with the common label portion and other side edges separable from the common label portion, the common label portion is partitioned into a first label portion articulated with the tag-fixed portion and a second label portion from which the tag-fixed portion is separable along the partition line extending across the common label portion from a side of the tag-fixed portion, the application device comprising:

an attachment plate operable for drawing the label;

an attachment plate transfer mechanism operable for moving the attachment plate in a range from an attachment point for drawing the label to an application point for applying the label such that the first or the second label portion of the label, with the partition line following a corner line of the article, is faced to the associated first or second surface of the article;

a folding and applying mechanism operable for folding the first or the second label portion along the partition line after the first or the second label portion is applied by the attachment plate and the folding and applying mechanism is operable for applying the first or the second label portion of the label to the associated first or the second surface of the article, and such that the tag-fixed portion is raised from the article.

5. The label application device according to claim 4, wherein the attachment plate is made in such a shape that when the first or the second label portion is folded by the folding and applying mechanism, the tag-fixed portion maintains a flush position with the first label portion movable therethrough in accordance with a motion of the first label portion or the folding and applying mechanism is movable to fold the second label portion and apply it to the second surface of the article, in either case such that the tag-fixed portion is raised from the article.

6. The label application device according to claim 4, wherein the folding and applying mechanism comprises:

a revolvable roller operable for revolving along a surface of the article;

a holder operable for holding the roller to be revolvable;

a driving mechanism operable for moving the holder in a range from a backward position to a forward position, and the roller is pressed over the first or the second label portion of the label in accordance with forward motion of the holder, and the roller is revolvable along the first or the second surface of the article, such that the tag-fixed portion is raised from the article.

7. The label application device according to claim 6, wherein the holder is movable with the attachment plate while the attachment plate is moved from the attachment point of the label to the application point of the label, and the holder is arranged with an attachment mechanism for drawing the label, the holder has an attachment surface that is flush with an attachment surface of the attachment plate when the holder is in a backward position, and the roller is laid between the attachment plate and the holder while the attachment plate is moved from the attachment point to the application point, and the roller is arranged on the holder next to the attachment plate.

8. A RFID label for being applied to an article, comprising the RFID label is tacked on a backing paper,
the RFID label is fixed with a tag-fixed portion which is fixed with a RFID tag comprising an IC chip and a communication antenna,
a common label portion;
the tag-fixed portion has a side edge articulated with the common label portion;
a partition line extending across the label for partitioning the label into the tag-fixed portion and the common label portion; and the tag-fixed portion is foldable along the partition line such that the tag fixed portion is configured to be raised off the common label portion to be raised from the RFID label while the tag-fixed portion is articulated to the common label portion.

9. A RFID label for being applied to an article, comprising:
the RFID label is tacked on a backing paper, the RFID label is fixed with a tag-fixed portion which is with a RFID tag comprising an IC chip and a communication antenna, the RFID label comprising:
a common label portion:
the tag-fixed portion has a side edge articulated with the common label portion;
a partition line for partitioning the label into the tag-fixed portion and the common label portion; and the tag-fixed portion is foldable along the partition line to be raised from the RFID label;
the tag-fixed portion having a predetermined size and being partitioned from the common label portion, the tag-fixed portion has other side edges that are separable from the common label portion, such that the RFID label is partitioned into a first label portion articulated with the tag-fixed portion and a second label portion, the tag-fixed portion is separable from the second label portion along the partition line, and the partition line extending across the common label portion from a side edge of the tag-fixed portion, such that the first label portion or the tag-fixed portion is folded when the label is applied to the article, whereby the tag fixed portion is raised from the common label portion.

10. The RFID label according to claim 9, wherein the tag-fixed portion is articulated with the common label portion, by means of perforations or slits.

11. The RFID label according to claim 8, wherein the RFID label comprises a substrate, prior to folding of the tag-fixed portion, the tag-fixed portion is flush with the common label portion, and
the tag fixed portion comprises a rigid substrate or a rigid thickness configured and operable to be raised from the article to which the label is applied.

12. The RFID label according to claim 8, wherein before being raised from the common label portion, the tag-fixed portion is flush with the common label portion, the RFID label has a back surface provided with a sheet-like reinforced substrate having rigidity capable of raising from the article the tag-fixed portion that is flush with the common label portion, and the sheet-like reinforced substrate is laid over a side of the tag-fixed portion.

13. The RFID label according to claim 8, wherein before being raised from the common label portion, the tag-fixed portion is flush with the common label portion, the RFID label has a back surface provided with a reinforced substrate having rigidity capable of raising from the article the tag-fixed portion that is flush with the common label portion, and the reinforced substrate is laid on the tag-fixed portion and on a part of the common label portion articulated therewith.

14. The RFID label according to claim 8, wherein the RFID label has a corner portion and the tag-fixed portion is laid on the corner portion of the RFID label.

15. The RFID label according to claim 8, wherein the RFID label has an intermediate portion, and the tag-fixed portion is laid on the intermediate portion of a side of the common label portion of the RFID label.

16. The RFID label according to claim 8, wherein the tag fixed portion has a back surface to be applied to the article, and the back surface of the tag-fixed portion is provided with non-adhesive or with a weak adhesive.

17. A method according to claim 2, further comprising associating the second label portion with a second surface of the article, wherein the second surface meets the first surface of the article at the cover portion of the article, and such that the tag-fixed portion is raised from the second label portion.

* * * * *